Feb. 11, 1964  B. VAN EMDEN  3,121,054
ELECTRICAL SIGNAL CONTROL SYSTEM
Filed Dec. 5, 1961

INVENTOR.
BERNARD VAN EMDEN
BY Elliott & Pastoriza
ATTORNEYS

United States Patent Office 3,121,054
Patented Feb. 11, 1964

3,121,054
ELECTRICAL SIGNAL CONTROL SYSTEM
Bernard Van Emden, Van Nuys, Calif., assignor to Automation Development Corporation, a corporation of California
Filed Dec. 5, 1961, Ser. No. 157,204
6 Claims. (Cl. 204—228)

This invention relates generally to electrical control systems and more particularly to a novel apparatus for controlling an output signal in accordance with a predetermined program.

There are many industrial processes in which a voltage or current must either by maintained within prescribed limits or must be varied in a prescribed manner during the carrying out of the process. For example, in a plating operation, it is extremely important to control the voltage applied to the electrodes in the plating tank. Thus, the voltage may have to be increased as the plated surface builds up in order to maintain the desired rate of deposition of ions in the solution. In other applications, it may be desirable to vary an output current in a prescribed manner over a given period of time.

Ordinarily, such control is carried out by a human operator who may change the voltage or current of an output signal to desired magnitudes at given times. The operator will observe various readings available on dials indicating the physical condition of the particular process at all periods of time and make the necessary adjustments as required.

With the above in mind, it is a primary object of this invention to provide a completely automatic system for controlling an output signal in accordance with a pre-arranged program to the end that the need for a human operator for this purpose is no longer necessary.

More particularly, it is an object to provide an electrical signal control apparatus in which an output signal may be programmed in accordance with a pre-determined function in a completely automatic manner and with greater accuracy than has been possible heretofore.

A particular object of this invention is to provide a novel voltage control system useful in an anodizing process.

Briefly, the preferred embodiment of the invention contemplates a system for controlling the voltage of an output signal. Towards this end, there is provided a source for the output signal, a stepper motor connected to vary the output signal in accordance with the direction and number of degrees of rotation of the stepper motor, a programming means, and a switch control and switch control means cooperating with the stepper motor and responsive to the programming means to step the motor in a direction to vary the output signal in accordance with the programming means.

Since the preferred embodiment of applicant's invention relates to voltage control in an anodizing process, the invention will be described in this connection. It is to be understood, however, that the principles of the invention are applicable to any similar process in which a voltage is to be controlled in a desired manner or alternatively in which a current is to be controlled in a desired manner.

Figure 1:
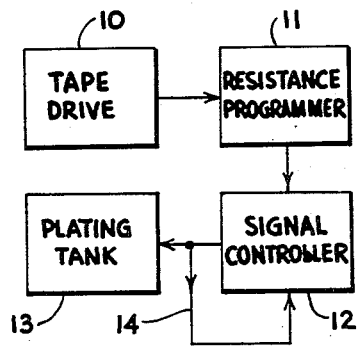
FIGURE 1 is a simple block diagram illustrating the basic components making up the electrical signal control system of this invention as used in an anodizing process.

Referring to FIGURE 1, there is shown a tape drive 10 connected to a resistance programmer 11. The tape drive includes a tape having information thereon in accordance with a pre-determined program of output signal variation with respect to time. This tape is arranged to actuate the resistance programmer in such a manner as to provide a variable voltage for comparison with a reference voltage in a signal controller 12.

The signal controller 12 includes a source for the output signal to be applied to the plating tank 13 which source is varied in accordance with variations in the resistance programmer 11. Towards this end, there is provided a feedback line 14 for sampling the output signal applied to the plating tank and employing this signal to derive the variable voltage from the resistance programmer 11 for comparison with the reference voltage, any variation serving to vary the output signal in a manner to bring the voltage applied to the plating tank back into correspondence with the desired program.

Figure 2:
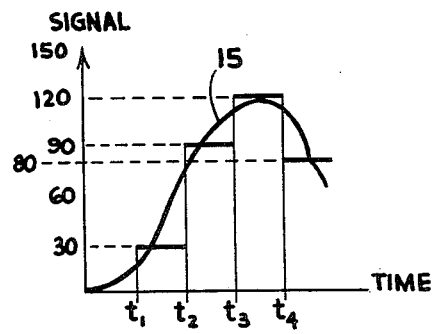
FIGURE 2 is a plot representing a pre-determined program illustrating a given variation of output signal with respect to time; and, FIGURE 3 is a detailed block diagram partly schematic illustrated in conjunction with an anodizing process for providing an output signal varying in the manner illustrated by the program of FIGURE 2.

With reference to FIGURE 2, for example, there is illustrated a plot 15 of the output voltage applied to the plating tank 13. It is assumed that the variation of the voltage of the signal with respect to time is as illustrated to carry out a certain stage of the anodizing process in the plating tank 13. In FIGURE 2, only a very small segment of the output signal over a short period of time is illustrated and the time increments together with the voltage changes are greatly exaggerated merely for purposes of clarity. Thus, the program requires thirty volts at time $t_1$, ninety volts at time $t_2$, 120 volts at time $t_3$, and eighty volts at time $t_4$. The manner in which this voltage program is automatically carried out will be clearer by referring to FIGURE 3 which illustrates the various blocks in FIGURE 1 in greater detail.

Figure 3:
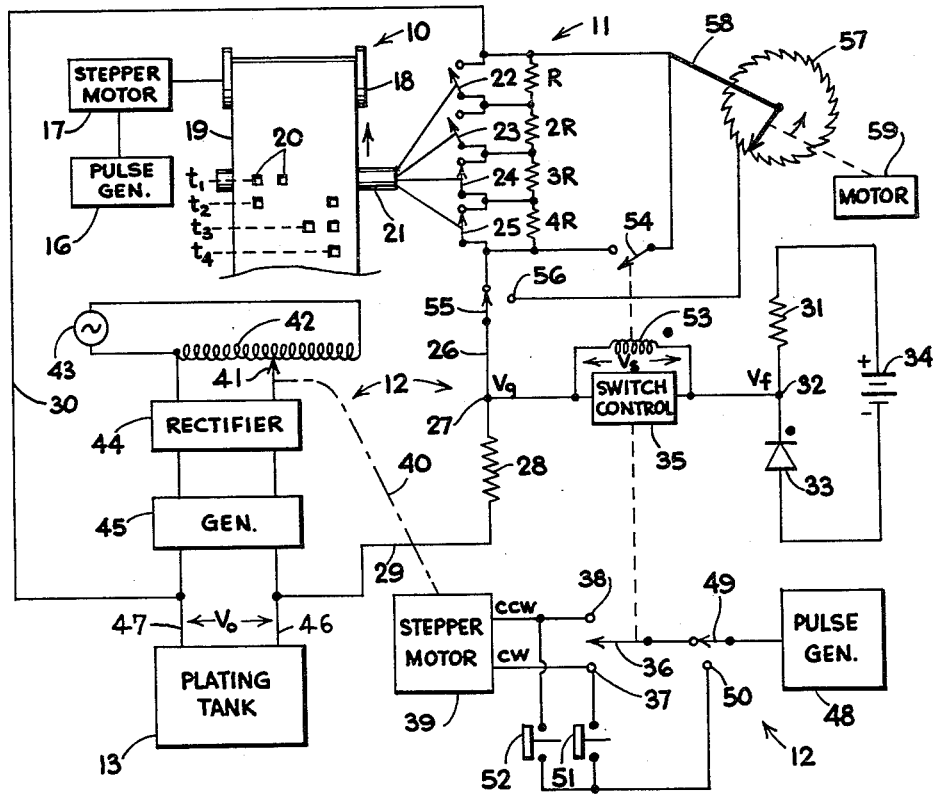

Referring to the upper left portion of FIGURE 3, there is illustrated the tape drive 10 as including a pulse generator 16, stepper motor 17, and tape spool 18 for driving a tape 19 at a speed determined by the number of pulses per unit time supplied from the pulse generator 16 to the stepper motor 17. Assuming that the time increments between the various times $t_1$, $t_2$, $t_3$, and $t_4$ are constant, the stepper motor 17 will drive the tape spool 18 at a constant speed to drive the tape 19 at a constant speed.

The tape 19 includes a coded program 20 arranged transversely across the tape in the form of a binary code. A switching control readout device 21 in turn is arranged to open and close a plurality of switches 22, 23, 24, 25, in accordance with the binary code appearing at the readout 21.

The switches 22–25 constitute part of the resistance programmer 11 and as shown, are respectively connected across a series of resistances R, 2R, 4R, and 8R. The series of resistances increase in a binary manner, each successive resistance being twice the value of the preceding resistance. One side of the series circuit formed by these resistances connects through a lead 26 to a junction 27 in the signal controller portion of the circuit. The junction 27 connects through a fixed resistance 28 and lead 29 to one input of the plating tank 13. The other side of the series resistances connects through lead 30 to the other input in the plating tank 13. The voltage applied across the plating tank is thus also applied across the program resistances and fixed resistance 28. These resistances constitute one side of a bridge type circuit and result in a voltage at the junction point 27 determined by the voltage applied to the tank and the value of the programming resistances.

The other side of the bridge type circuit includes a fixed resistance 31 connecting through a junction point 32 to a zener diode 33. The zener diode 33 provides a fixed regulated reference voltage at the junction point 32 from a D.-C. source such as schematically indicated by the battery 34.

Between the junction points 27 ad 32 is a "compensator" circuit in the form of a switch control means 35. This means is sensitive to the plurality of and magnitude of the voltage difference $V_s$ appearing between the junction points 27 and 32.

As shown, this switch control means 35 is arranged to control a switch arm 36 having three states. A first state of the switch occurs when the switch arm 36 is switched to a first input terminal 37 and a second state exists when the switch arm 35 is thrown to a second input terminal 38. The input terminals 37 and 38 connect to clockwise and counterclockwise inputs to a stepper motor 39 mechanically connected as indicated at 40 to move a variable tap 41' on an auto transformer 42. The switch arm 36 has a third state which is in its central position between the contacts 37 and 38 so that in this position, the stepper motor is disconnected from the circuit.

The auto-transformer is energized by an A.-C. source 43 and has its output as determined by the position of the tap 41 connected through a rectifier 44 and generator 45 to provide the output signal to be programmed to the plating tank 13 as shown.

Stepper motor 39 is powered by stepping pulses provided by a pulse generator 48 connecting through a normally closed switch 49 to the switch arm 36 so that pulses will either be applied to the clockwise input terminal 37 or the counterclockwise input terminal 38 or blocked from being recieved in either terminal, depending upon the state of the switch arm 36. This state or position of the switch arm 36 is controlled by the switch control means 35 as will become clearer when the operation of the system is described.

Also provided as a part of the circuit is an external control means including a terminal 50 arranged to receive the switch arm 49 from the pulse generator 48. Terminal 50 connects through two push buttons 51 and 52 to the input terminals 37 and 38 of the stepper motor 39. With this arrangement and with the switch arm 49 thrown to the terminal 50, it is possible to control movement of the stepper motor in either direction independently of the switch control means 35. In other words, depression of either of the buttons 51 or 52 will pass pulses to one of the inputs to the stepper motor to move the variable tap on the auto-transformer 42 and thus vary the voltage of the output signal applied to the plating tank 13.

As a safety precaution, there is provided a polarized relay coil 53 connected across the switch control means 35 and responsive only to a sudden change in voltage between the junction points 27 and 32 in one direction to close a switch 54 and shunt out all of the series connected programming resistances. This action will result in the output signal voltage being rapidly reduced to zero by the stepper motor and tap 42.

The operation of the system illustrated in FIGURE 3 will be clear from the foregoing description. Assuming that the desired program for the variation of voltage in the output signal is as illustrated diagrammatically in FIGURE 2, the tape 19 is provided with a binary code corersponding to the times $t_1$, $t_2$, $t_3$, and $t_4$ as illustrated by the various perforations 20. When the tape drive stepper motor 17 is turned on, the first perforations 20 to reach the readout 21 are grouped such as to open switches 22 and 23. With switches 22 and 23 open, resistances R and 2R are placed in series with the fixed resistance 28 to provide a given voltage $V_g$ at the junction point 27 determined by the plating tank input voltage at this time between the leads 29 and 30. There will also be the reference voltage $V_f$ appearing at the junction point 32. Assuming that the output voltage $V_o$ applied to the plating tank 13 is thirty volts or the proper voltage in accordance with the program at this time, the voltage $V_g$ at the junction 27 is made equal to the reference voltage $V_f$ by properly calibrating the value of the fixed resistance 28 to effect the proper voltage division. The voltage $V_s$ will thus be zero and the switch arm 36 will stay in its neutral position since no voltage is applied across the switch control means 35 so that no pulses will be passed to the stepper motor 39. The tap 41 will then stay at the same position on the auto-transformer 42 fixing the output voltage from the generator 45 at the value thirty volts.

When the time $t_2$ arrives, the perforations will cause switch 22 to remain open and switch 25 to open, switch 23 closing since there is no perforation corresponding to this switch. The total resistance in the resistance network 11 will then be the sum of R and 8R which corresponds to ninety volts in accordance with the program shown in FIGURE 2. This change of resistance will change the given voltage $V_g$ and thus the voltage $V_s$ across the switch control 35 in such a manner as to energize the switch control to throw the switch arm 36 to one or the other of the terminals 37 and 38 of the stepper motor 39. Assume that when pulses are applied to the clockwise terminal 37 the output voltage $V_o$ is increased by movement of the tap 41 to the right. In this case, the switch control 35 when subjected to a change of potential thereacross as a result of the increased resistance in the resistance network will throw the switch arm 36 to the terminal 37, thereby applying pulses from the pulse generator 48 to the stepper motor 39. These pulses will move the tap 41 to the right to increase the output voltage until $V_g$ and $V_f$ are equal. This occurs when $V_o$ is ninety volts. At this time, the difference voltage $V_s$ between the junction points 27 and 32 appearing across the switch control is reduced to zero so that the switch control 35 will return the arm 36 to the neutral position.

At the time $t_3$, the resistance network 11 will be altered by the tape 19 by opening the switches 24 and 25 to provide a total of 12R in the resistance circuit which will result in a further increase in the output voltage to the value of 120 volts to again reduce the difference voltage $V_s$ to zero. Similarly, at time $t_4$ when only the switch 25 is open, only 8R will appear in the resistance network with the result that the switch control will operate in the opposite direction to throw the switch arm 36 to the terminal 38 and decrease the output voltage to the value of eighty volts.

It will thus be seen that the resistance network establishes a given voltage at the junction 27 which is compared to the reference voltage. Any changes in either the output voltage $V_o$ or in the total resistance in the programmer results in operation of the switch control 35 to move the switch arm 36 in a proper direction to effect a change in the output voltage which will maintain $V_g$ equal to $V_f$.

The rate of resetting of the output voltage in accordance with the program can be controlled by varying the pulse generation rate from the pulse generator 48 which in turn varies the speed at which the stepper motor 39 operates.

In the event it is desired to vary the signal voltage applied to the plating tank 13 externally independently of the programming provided by the tape drive mechanism 10 and resistance programmer 11, the switch arm 49 from the pulse generator 48 may be thrown to the terminal 50 and either the push button 51 or push button 52 depressed, depending upon whether it is desired to increase or decrease the output voltage.

It will also be evident from the foregoing description that the system of FIGURE 3 operates automatically as a voltage regulator. For example, if the various resistances in the resistance programmer 11 are fixed at a given value, the output voltage will be fixed at a given value, any deviation therefrom operating the switch control 35 to return the voltage by variation of the tap 28 to a value to re-establish the null conditions between the voltage $V_g$ and the reference voltage $V_f$.

When the system is employed in an anodizing process, "burn-out" resulting from a sudden increase in current between the plating electrodes in the tank 13 is avoided by the safety relay 53. Thus, such a sudden increase will result in a sudden lowering of the voltage $V_o$ considerably more rapidly than the desired programmed changes. This voltage drop will operate the relay 53 to short out the programming resistances and thus increase the voltage $V_g$ at junction point 27. This increase will operate the switch control and arm to cause the stepper motor to reduce the output voltage to a low value corresponding to the reference voltage $V_f$. By employing a latch type relay, the output voltage will be held at this low voltage value until the trouble is corrected at which time the switch arm 54 may be manually opened by any suitable reset means.

It is also possible to incorporate in the circuit a resistance which varies linearly with time and substitute this resistance for the resistance programmer 11. To this end, there is provided a switch 55 in lead 26 arranged to connect to a terminal 56 connected to a rheostat 57. Rheostat 57 has a rotatable contact arm connected through lead 58 to the upper side of the resistance programmer. This arm may be continuously driven at a constant speed in one direction by a motor 59. There will thus be provided a linear variation of resistance with respect to time. If the switch arm 55 is now thrown to the terminal 56, the rheostat 57 will be placed in series with the fixed resistance 28 through the junction point 27 so that the output voltage will be caused to vary in a manner linearly with time in the same manner as rheostat 57 is varied by the motor 59.

From the foregoing description, it will be seen that the present invention has provided an accurate means for programming an output signal in a completely automatic manner. While a mechanical type switching means 35 and 36 has been shown, it will be evident that any equivalent switching means such as solid state switching transistors, diodes, and the like may be used to define the three states constituting the possible switch positions, such solid state switching elements being responsive to the difference between the voltage $V_g$ and reference voltage $V_f$.

Other modifications of the circuit illustrated in FIGURE 3 for carrying out desired functions that fall clearly within the spirit and scope of this invention will occur to those skilled in the art. The electrical signal control system is therefore not to be thought of as limited to the particular embodiment set forth merely for illustrative purposes.

What is claimed is:

1. A system for controlling an output signal in accordance with a given program of signal variation with respect to time comprising, in combination:
    (a) a tape drive mechanism including a moving tape having coded information thereon representing said given program;
    (b) a resistance network including switch means connected to said tape drive mechanism and responsive to said coded information on said tape for changing the overall resistance in said network in accordance with said given program;
    (c) a fixed resistance connected to said network, said output signal being applied across said network and fixed resistance to establish a given voltage at the junction of said network and fixed resistance;
    (d) a reference voltage;
    (e) a variable source of signal energy for providing said output signal;
    (f) a stepper motor connected to vary said source at a rate proportional to the number of stepping pulses received by said motor per unit time;
    (g) a pulse generator for providing said stepping pulses; and
    (h) a control means disposed between said pulse generator and stepper motor and connected to said junction of said resistance network and fixed resistance and to receive said reference voltage for passing pulses from said pulse generator to said stepper motor in accordance with the difference between said given voltage and said reference voltage and to step said motor in a direction to vary said output signal to the value defined by said program, said control means blocking pulses from passing to said motor when said output signal corresponds to said given program of signal variation as determined by said given voltage.

2. A system according to claim 1, in which said stepper motor includes first and second inputs for stepping said motor in first and second directions to increase and decrease the value of said output signal respectively, said control means including:
    (a) a switch means connected to said pulse generator and having first, second, and third states, said first and second state passing said stepping pulses to said first and second inputs respectively, and said third state blocking stepping pulses from passing to said stepper motor; and,
    (b) a switch means control connected between said junction and reference voltage and responsive to a balance between said given voltage and reference voltage to hold said switch means in said third state, a change in said balance resulting from a change in said given voltage causing said switch means control to change said switch means to one of said first and second states to step said motor and vary said output signal in a direction to again balance said given voltage with said reference voltage.

3. A system according to claim 2, including externally operable first and second switches for connecting said pulse generator directly to said first and second inputs of said stepper motor bypassing said switch means whereby said output signal may be externally controlled.

4. A system according to claim 3, in which said output signal constitutes an output voltage applied to a plating tank for controlling an anodizing process.

5. A system for controlling an output signal in accordance with a pre-determined program of signal variation with respect to time comprising, in combination:
    (a) A source for providing said output signal;
    (b) A stepper motor connected to said source to vary said output signal in accordance with the number of degrees of rotation of said stepper motor;
    (c) Program means for providing a given signal derived from said output signal and including means for varying said given signal in accordance with said predetermined program of signal variation;
    (b) A fixed reference signal; and,
    (e) Means cooperating with said stepper motor and and responsive to the difference between said given signal and said reference signal to step said motor in a direction to vary said output signal until said given signal is equal to said reference signal, stepping of said stepper motor thereby controlling said source to vary said output signal in accordance with said predetermined program.

6. A system according to claim 5, in which said program means includes: a resistance varying linearly with time; and a fixed resistance in series therewith to provide a series circuit, said output signal being connected across said series circuit, and said given signal being derived from across said fixed resistance whereby said output signal is varied linearly with time.

References Cited in the file of this patent
UNITED STATES PATENTS

| | | |
|---|---|---|
| 2,913,591 | Smith et al. | Nov. 17, 1959 |
| 2,966,626 | Kalina et al. | Dec. 27, 1960 |
| 3,027,510 | Scott | Mar. 27, 1962 |

FOREIGN PATENTS

| | | |
|---|---|---|
| 811,047 | Great Britain | Mar. 25, 1959 |
| 1,153,204 | France | Mar. 4, 1958 |